(12) United States Patent
Kobayakawa et al.

(10) Patent No.: US 11,485,521 B2
(45) Date of Patent: Nov. 1, 2022

(54) SPACECRAFT AND CONTROL DEVICE

(71) Applicant: MITSUBISHI HEAVY INDUSTRIES, LTD., Tokyo (JP)

(72) Inventors: Toyonori Kobayakawa, Tokyo (JP); Tetsuya Nagase, Tokyo (JP); Atsushi Sasaki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 525 days.

(21) Appl. No.: 16/318,844

(22) PCT Filed: Dec. 22, 2017

(86) PCT No.: PCT/JP2017/046175
§ 371 (c)(1),
(2) Date: Jan. 18, 2019

(87) PCT Pub. No.: WO2018/123885
PCT Pub. Date: Jul. 5, 2018

(65) Prior Publication Data
US 2020/0239163 A1 Jul. 30, 2020

(30) Foreign Application Priority Data
Dec. 26, 2016 (JP) .............................. JP2016-251850

(51) Int. Cl.
*B64G 1/26* (2006.01)
*B64G 1/24* (2006.01)
*G05D 1/06* (2006.01)

(52) U.S. Cl.
CPC .............. *B64G 1/26* (2013.01); *B64G 1/244* (2019.05); *G05D 1/0676* (2013.01); *B64G 2001/245* (2013.01); *B64G 2001/247* (2013.01)

(58) Field of Classification Search
CPC .... B64G 1/26; B64G 1/244; B64G 2001/245; B64G 2001/247; G05D 1/0676
See application file for complete search history.

(56) References Cited

U.S. PATENT DOCUMENTS 5,064,151 A * 11/1991 Cerimele ................. B64G 1/62
244/172.1
9,045,240 B2   6/2015 Nagase et al.
(Continued)

FOREIGN PATENT DOCUMENTS

JP          09-58597       3/1997
JP          11-301598      11/1999
(Continued)

OTHER PUBLICATIONS

Avijit Banerjee and Radhakant Padhi, Inverse Polynomial Based Explicit Guidance for Lunar Soft Landing, Sep. 23, 2015, 2015 IEEE Conference on Control Applications (CCA), 2015 IEEE Multi-Conference on Systems and Control Sep. 21-23, 2015. (Year: 2015).*

(Continued)

*Primary Examiner* — Maceeh Anwari
*Assistant Examiner* — Charles Pall
(74) *Attorney, Agent, or Firm* — Wenderoth, Lind & Ponack, L.L.P.

(57) ABSTRACT

A spacecraft including: an engine; a thrust vector control device controlling a thrust vector as a direction of a thrust acting on the spacecraft; and a main control device configured to acquire state quantities of the spacecraft in a powered descending in which the spacecraft is guided to a target point while the engine generates the thrust, and generate a throttling command by which combustion of the engine is controlled and an operation command by which the thrust vector control device is operated. The state quantities contain a first acceleration parameter and a second acceleration parameter. The first and second acceleration parameters are calculated as coefficients A and B obtained by fitting based on acceleration of the spacecraft previously detected, supposing the following equation is satisfied between a reciprocal number 1/a of the acceleration a of the spacecraft and time t:

$$1/a = -At + B \qquad (1).$$

15 Claims, 9 Drawing Sheets

(56) References Cited

U.S. PATENT DOCUMENTS

| | | | |
|---|---|---|---|
| 2010/0228409 A1* | 9/2010 | Acikmese | G05D 1/0676 |
| | | | 701/16 |
| 2010/0314497 A1 | 12/2010 | Boelitz | |
| 2014/0136029 A1* | 5/2014 | Nagase | B64G 1/242 |
| | | | 701/3 |
| 2016/0023783 A1 | 1/2016 | Griffith, Sr. et al. | |
| 2017/0267379 A1 | 9/2017 | Kobayakawa et al. | |

FOREIGN PATENT DOCUMENTS

| | | | |
|---|---|---|---|
| JP | 2002-220097 | | 8/2002 |
| JP | 2002220097 A | * | 8/2002 |
| JP | 2013-18405 | | 1/2013 |
| WO | 2016/047343 | | 3/2016 |

OTHER PUBLICATIONS

Meditch, J.S. (1964). On the problem of optimal thrust programming for a lunar soft landing. IEEE Transactions on Automatic Control, 9, 233-238. (Year: 1964).*

Extended European Search Report dated Jul. 15, 2020 in corresponding European Patent Application No. 17888741.0.

International Search Report dated Mar. 27, 2018 in International (PCT) Application No. PCT/JP2017/046175.

Mehedi, I. M., Kubota, Takashi, "A Trajectory Generation Scheme for Precise and Safe Lunar Landing", Journal of Space Engineering, vol. 4, Issue 1, released on May 18, 2011, pp. 1-13 [online], [retrieved on Mar. 15, 2018], retrieved from the Internet: <URL:https://doi.org/10.1299/spacee.4.1>.

Rijesh, M. P.; Sijo, G.; Philip, N. K.; Natarajan, P., "Geometrical Guidance Algorithm for Soft Landing on Lunar Surface", IFAC Proceedings Volumes, vol. 47, Issue 1, Available Online, Apr. 21, 2016, pp. 14-19 [online], [retrieved on Mar. 15, 2018], retrieved from the Internet: <URL:https://doi.org/10.3182/20140313-3-IN-3024.00 093>.

International Preliminary Report on Patentability and Written Opinion of the International Searching Authority dated Jul. 11, 2019 in International (PCT) Application No. PCT/JP2017/046175.

* cited by examiner

SPACECRAFT AND CONTROL DEVICE

TECHNICAL FIELD

The present invention relates to a spacecraft and a control device, and especially, the technique of guiding a spacecraft to a desired point when the spacecraft is landed on the desired point of a gravitational body.

BACKGROUND ART

In the most typical one of procedures of making a spacecraft land on a desired point of a gravitational body (e.g. the moon), the spacecraft is put in an orbit of the gravitational body and then guided to a target point set above a desired landing point from the orbit, and after that, the spacecraft is landed on the landing point by vertical descending.

One of problems in case of making the spacecraft land on the gravitational body is in that various errors can be generated in the guidance of the spacecraft. For example, an initial condition error (for example, the velocity and position of the spacecraft), and a spacecraft error such as a specific thrust and an initial mass have an influence on the guidance accuracy. It is desirable that the guidance logic used for guidance of the spacecraft is designed to appropriately deal with an occurring error and to correctly guide the spacecraft to the desired target point.

However, according to consideration of the inventors, there is a room to be improved in the well-known guiding method in dealing with various errors which would occur.

As the techniques related to the present invention, JP H11-301598A discloses the technique in which an altitude, an altitude direction velocity and a thrust vector angle in the optimum guidance control calculated by using a ground computer to minimize the propellant consumption are expressed by a horizontal direction velocity profile, and a spacecraft is guided to trace an orbit prescribed by the profile.

Also, JP 2002-220097A discloses a spacecraft that includes an inertia sensor device having an accelerometer to detect an acceleration a of the spacecraft, a reciprocal number calculating device to calculate a reciprocal number 1/a of the acceleration, a smoothing unit to smooth the reciprocal number of the acceleration, a processing control device to carry out guidance control of the spacecraft by using the reciprocal number of acceleration after the smoothing as input data.

CITATION LIST

Patent Literature

[Patent Literature 1] JP H11-301598A
[Patent Literature 2] JP 2002-220097A

SUMMARY OF THE INVENTION

Therefore, an object of the present invention is to provide a technique to appropriately deal with an error in a landing guidance of a spacecraft and to guide the spacecraft correctly to a desired target point. Other objects and new features of the present invention could be understood by the skilled person from the following disclosure.

According to an aspect of the present invention, a spacecraft configured to land on a gravitational body is provided. The spacecraft includes an engine; a thrust vector control device configured to control a thrust vector as a direction of thrust acting on the spacecraft; and a main control device configured to acquire state quantities of the spacecraft in powered descending in which the spacecraft is guided to a target point 3 while the engine generates the thrust, and to generate based on the acquired state quantities a throttling command to control combustion of the engine and an operation command to operate the thrust vector control device.

The acquired state quantities contain a first acceleration parameter and a second acceleration parameter. The first acceleration parameter and the second acceleration parameter are calculated as coefficients A and B obtained by fitting based on an acceleration of the spacecraft detected at each time of past, supposing that the following equation (1) is satisfied between a reciprocal number 1/a of the acceleration a of the spacecraft and time t:

$$1/a = -At + B \qquad (1).$$

In a preferred embodiment, the main control device is configured to calculate time-to-go as a time for which the combustion of the engine is to be continued thereafter, based on the first acceleration parameter and the second acceleration parameter in the powered descending.

At this time, the main control device is configured to calculate a burn time variation showing a change quantity of a time from a start of the combustion of the engine to a stop thereof from a nominal combustion time based on a combustion time of the engine to a current time from the start of the combustion of the engine in the powered descending, the time-to-go, and a nominal combustion time as the combustion time of the engine when the spacecraft is guided along a nominal orbit as an orbit planned initially for the spacecraft, and it is desirable that the state quantities used for guidance of the spacecraft contain the burn time variation. In this case, the main control device is configured to calculate a target thrust vector by using the first acceleration parameter, the second acceleration parameter and the burn time variation, and the thrust vector control device controls the thrust vector of the spacecraft such that the thrust vector of the spacecraft is directed to the target thrust vector.

In a preferred embodiment, the state quantities used for the guidance of the spacecraft contain an initial cross range position error as a cross range angle of the spacecraft at a time when the powered descending is started and an initial horizontal velocity error as a velocity of the spacecraft in a cross range direction at the time when the powered descending is started. In this case, preferably, the main control device is configured to calculate the target thrust vector by using the initial cross range position error and the initial horizontal velocity error at each time during the powered descending, and the thrust vector control device controls the thrust vector of the spacecraft such that the thrust vector of the spacecraft is directed to the target thrust vector.

In the embodiment, the main control device has a storage unit which stores landing guidance polynomial data which describes coefficients of a first polynomial having the state quantities as variables, and is configured to calculate the time-to-go from the first polynomial by using the coefficients of the first polynomial described in the landing guidance polynomial data. In this case, it is desirable that the coefficients of the first polynomial are calculated previously before the powered descending is started and stored in the storage unit as the landing guidance polynomial data.

In the embodiment, the main control device has a storage unit which stores the landing guidance polynomial data in which coefficients of a second polynomial having the state quantities as variables are described, and is configured to calculate the target thrust vector from the second polynomial by using the coefficients of the second polynomial described in the landing guidance polynomial data. In this case, it is desirable that the coefficients of the second polynomial are calculated previously before the powered descending is started and stored in the storage unit as the landing guidance polynomial data.

According to another aspect of the present invention, a non-transitory storage medium is provided which stores a program to make a control device to operate so as to control a spacecraft which includes an engine and is configured to carry out a powered descending while generating a thrust by the engine. The program makes the control device execute a series of steps in the powered descending in which the spacecraft is guided to a target point while generating a thrust by the engine. The series of steps includes: acquiring state quantities of the spacecraft; generating a throttling command to control combustion of the engine according to the acquired state quantities; and generating an operation command to operate a thrust vector control device which controls a thrust vector as a direction of thrust acting on the spacecraft according to the acquired state quantities. The state quantities used for guidance of the spacecraft contain a first acceleration parameter and a second acceleration parameter. the first acceleration parameter and the second acceleration parameter are respectively calculated as coefficients A and B obtained by fitting based on an acceleration of the spacecraft detected at each time of past, supposing that the following equation is established between a reciprocal number 1/a of the acceleration a of the spacecraft and the time t (1):

$$1/a = -At + B \quad (1).$$

According to still another aspect of the present invention, a control device configured to control a spacecraft having an engine and configured to carry out a powered descending while the engine generates a thrust is provided. The control device includes: a processing unit configured to acquire state quantities of the spacecraft in the powered descending, and generate a throttling command to control combustion of an engine according to the acquired state quantities and an operation command to operate a thrust vector control device to control a thrust vector as a direction of the thrust acting on the spacecraft; and a control command interface configured to supply the throttling command to the engine and to supply the operation command to the thrust vector control device. The state quantities used for guidance of the spacecraft contain a first acceleration parameter and a second acceleration parameter. The first acceleration parameter and the second acceleration parameter are respectively calculated as coefficients A and B obtained by fitting based on an acceleration of the spacecraft detected at each time of past, supposing that the following equation is satisfied between a reciprocal number 1/a of the acceleration a of the spacecraft and time t (1):

$$1/a = -At + B \quad (1).$$

According to the present invention, a technique can be provided which appropriately deals with an error in a landing guidance of a spacecraft and guides the spacecraft correctly to a desired target point

DESCRIPTION OF THE EMBODIMENTS

Hereinafter, referring to the attached drawings, embodiments of the present invention will be described.

Figure 1:
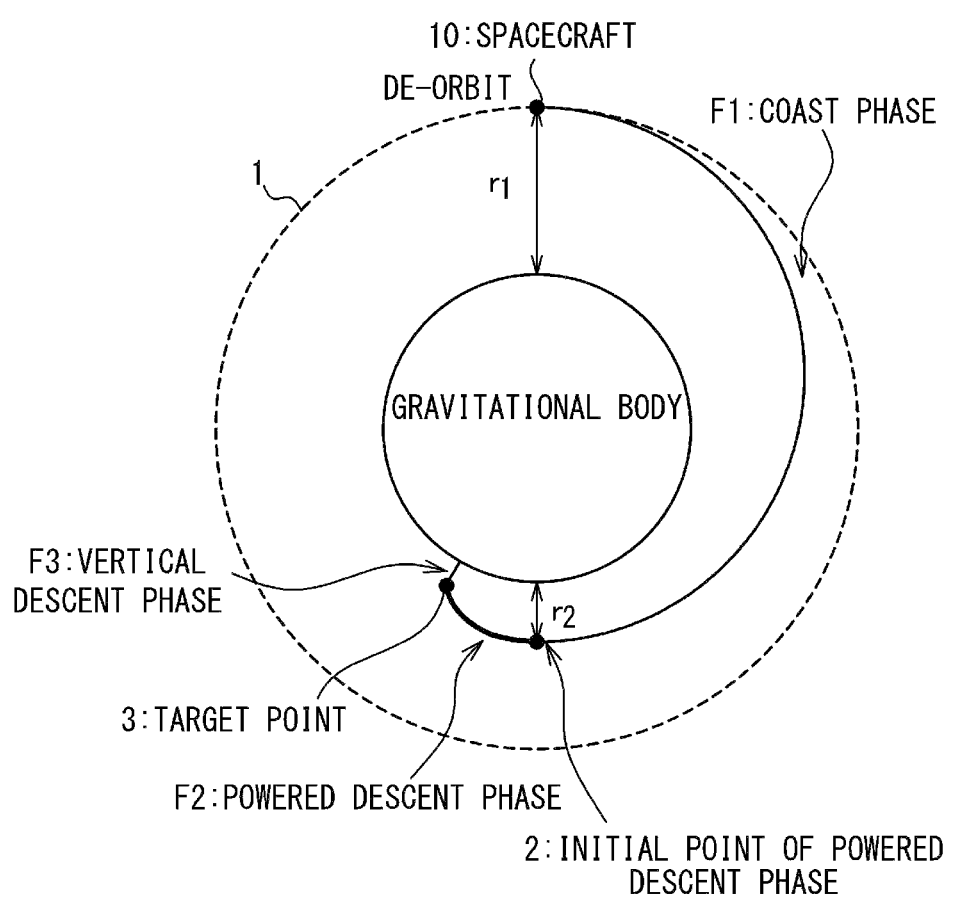
FIG. 1 is a conceptual diagram showing an example of landing sequence carried out in an embodiment.

FIG. 1 is a diagram showing an example of landing sequence (sequence of making a spacecraft land on the gravitational body) carried out in the present embodiment. In the present embodiment, the landing sequence has three phases: a coast phase F1, a powered descent phase F2, and a vertical descent phase F3.

The spacecraft is supposed to have been put in the orbit in an initial state. In the coast phase F1, the spacecraft is made to de-orbit and to move to an initial point 2 of powered descent phase. In the powered descent phase F2, the powered descending is carried out in order to guide the spacecraft to a target point 3 while generating a thrust by the engine 11. When the powered descent phase F2 is started, the engine 11 is fired so that combustion is started. Moreover, the spacecraft is guided to the target point 3 while the spacecraft is decelerated with the thrust generated by the engine 11. In the vertical descent phase F3, the spacecraft is made to carry out the vertical descending from the target point 3 and to land on the surface of the gravitational body.

The guidance of the spacecraft in the powered descent phase F2 is one of the important problems in the landing sequence. In the powered descent phase F2, generally, the spacecraft is guided to the target point 3 by controlling the attitude of the spacecraft while generating a constant thrust by the engine 11. In the guidance of the spacecraft in the powered descent phase F2, the calculation of time-to-go (time-to-go) and target thrust vector is carried out. In this case, the time-to-go is a time for which the combustion of the engine 11 should be continued thereafter. If the time-to-go is calculated to be "0", the combustion of the engine 11 is stopped. The target thrust vector is a direction to which the thrust acting on the spacecraft should be directed. In the present embodiment, the thrust is directed to the target thrust vector by controlling the attitude of the spacecraft. As described later in detail, in the present embodiment, the guidance of the spacecraft in the powered descent phase F2 is considered.

Figure 2:
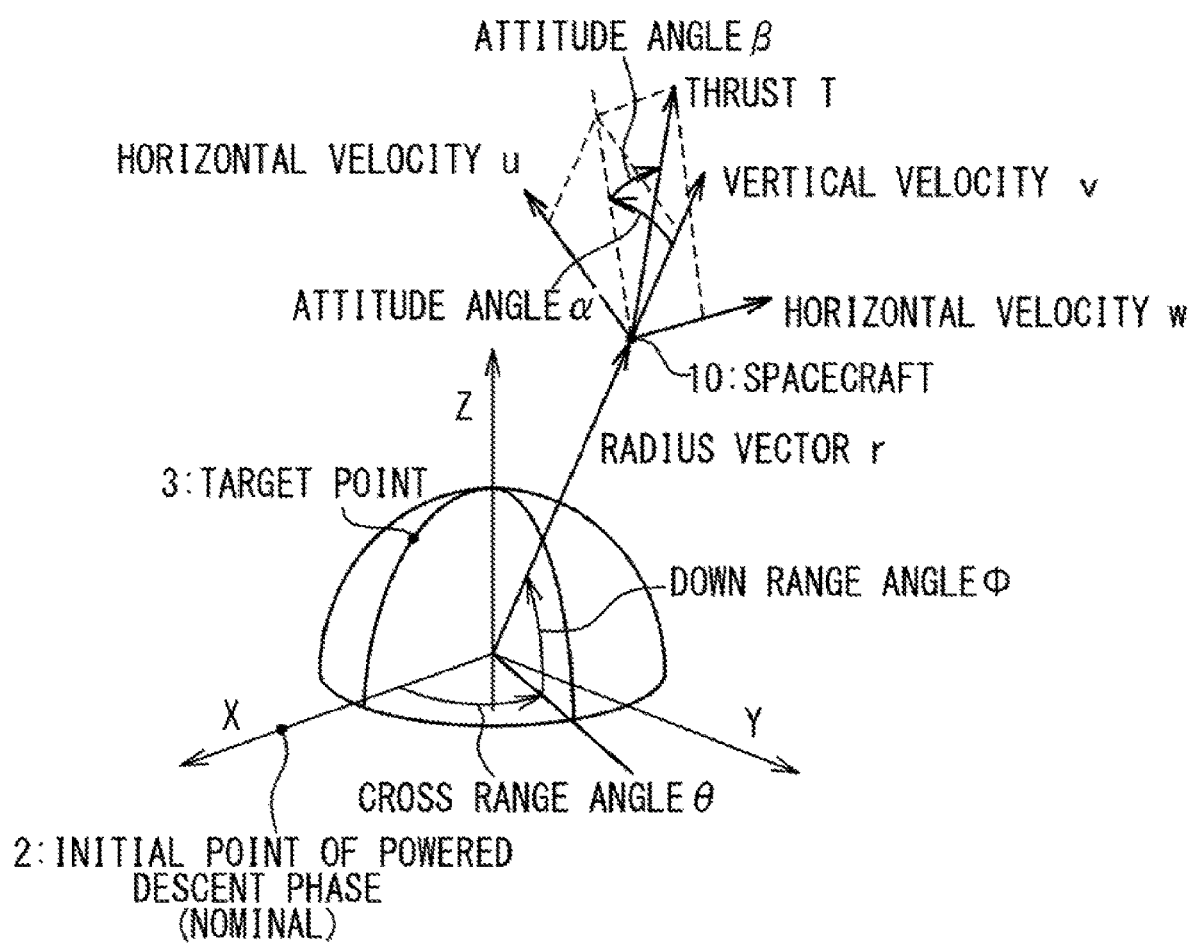
FIG. 2 is a diagram showing the definitions of a coordinate system and state quantities of a spacecraft introduced in the embodiment.

FIG. 2 shows a coordinate system introduced in the following description and the definitions of the state quantities of the spacecraft. An XYZ cartesian coordinate system is prescribed to have as an origin, a center of the gravitational body (e.g. the moon) on which the spacecraft lands. An X axis and a Z axis are prescribed such that an XZ plane contains an initial point 2 of nominal powered descent phase, the target point 3 and the origin, and these axes are orthogonal to each other. The "start point 2 of nominal powered descent phase" is a planned point of the initial point 2 of powered descent phase. A Y axis is prescribed to be orthogonal to the XZ plane and to be a right-hand system.

It is supposed that the position of the spacecraft is shown based on a down range angle φ, a cross range angle θ and a radius vector r. The down range angle φ is defined as an angle between a line segment linking the spacecraft and the origin and the XY plane. The cross range angle θ is defined as an angle between the X axis and a projection of the line segment linking the spacecraft and the origin onto the XY plane. The radius vector r is defined as a distance between the spacecraft and the center (the origin) of the gravitational body. Also, a direction for the spacecraft from the center of the gravitational body is called a radius vector direction.

The velocity of the spacecraft is shown by horizontal velocities u and w and a vertical velocity v. The horizontal velocity u is the velocity of the spacecraft in a direction in a plane orthogonal to the XY plane and containing the line segment linking the spacecraft and the origin, the direction being orthogonal to the radius vector direction. The horizontal velocity w is the velocity of the spacecraft in the direction orthogonal to the radius vector direction and orthogonal to the horizontal velocity u. The horizontal velocity u is a parameter related to the down range angle φ, and the horizontal velocity w is a parameter related to the cross range angle θ. The vertical velocity v is the velocity of the spacecraft in the radius vector direction. A vector showing the horizontal velocity u is expressed as a velocity vector u. The velocity vector u is a vector having the magnitude of the horizontal velocity u and the direction in the plane containing the line segment linking the spacecraft and the origin and orthogonal to the XY plane. In the same way, a vector showing the horizontal velocity w is expressed as a velocity vector w, and a vector showing the vertical velocity v is expressed as a velocity vector v.

It is supposed that the attitude of the spacecraft is specified by attitude angles α and β. The attitude angle α is defined in the plane containing the velocity vectors u and v, and defined as an angle between the velocity vector v and a projection of a thrust vector T onto the plane containing the velocity vectors u and v. In this case, the thrust vector T is a vector showing a thrust T generated by the engine 11. The thrust vector T has the magnitude of the thrust T and the direction of the thrust generated by the engine 11. The attitude angle β is defined as an angle between the thrust vector T and the plane containing the velocity vectors u and v.

Figure 3:
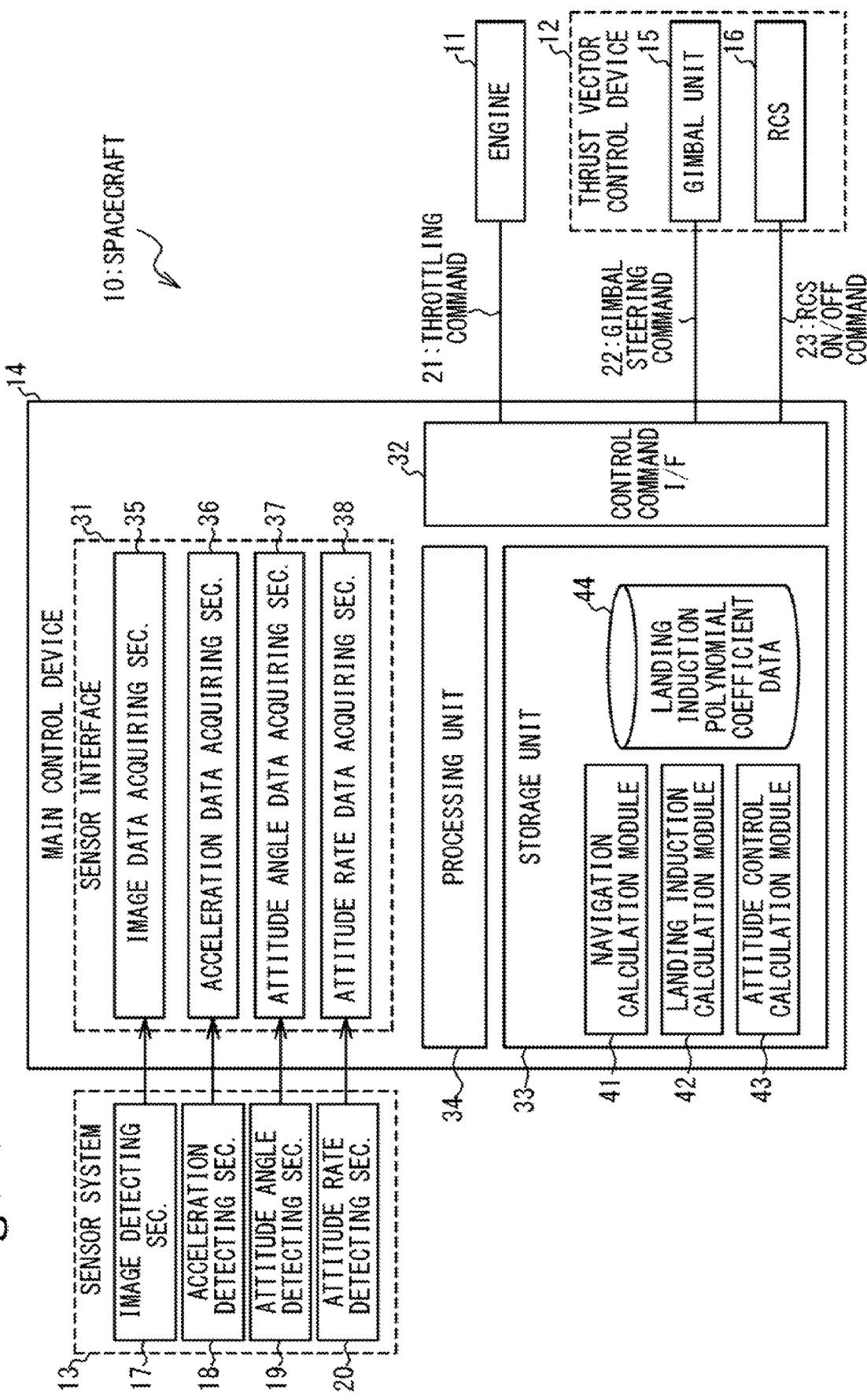
FIG. 3 is a block diagram schematically showing a configuration of the spacecraft in an embodiment.

FIG. 3 is a block diagram schematically showing the configuration of the spacecraft according to the present embodiment. The spacecraft 10 has an engine 11, a thrust vector control device 12, a sensor system 13 and a main control device 14.

The engine 11 generates the thrust in response to a throttling command 21 supplied from the main control device 14. As described later in detail, the engine 11 starts the combustion in response to the throttling command 21 at the start of the powered descent phase F2, and stops the combustion in response to the throttling command 21 when the time-to-go calculated by the main control device 14 becomes zero.

The thrust vector control device 12 controls the direction of the thrust generated by the engine 11. In the present embodiment, the thrust vector control device 12 has a gimbal unit 15 or an RCS (Reaction Control System) 16, or the both. The gimbal unit 15 controls the direction of a nozzle of the engine 11 in response to a gimbal steering command 22 supplied from the main control device 14. The RCS 16 controls the attitude of the spacecraft 10 in response to an RCS on/off command 23 supplied from the main control device 14. The gimbal steering command 22 and the RCS on/off command 23 are used as operation commands to operate the thrust vector control device 12. The direction of thrust generated by the engine 11 is controlled by an operation of the gimbal unit 15 and the RCS 16 or the operations of both.

The sensor system 13 is used to acquire various data used for the guidance of the spacecraft 10. In the present embodiment, the sensor system 13 has an image detecting section 17, an acceleration detecting section 18, an attitude angle detecting section 19 and an attitude rate detecting section 20. The image detecting section 17 images a gravitational body surface and so on and acquires image data. The acceleration detecting section 18 detects an acceleration of the spacecraft 10 and generates acceleration data showing the detected acceleration. The attitude angle detecting section 19 detects the attitude angle of the spacecraft 10 and generates attitude angle data showing the detected attitude angle. The attitude rate detecting section 20 detects an attitude rate of the spacecraft 10 and generates attitude rate data showing the detected attitude rate.

The main control device 14 controls the engine 11 and the thrust vector control device 12 based on the various data acquired by the sensor system 13. In the present embodiment, the main control device 14 has a sensor interface 31, a control command interface 32, a storage unit 33 and a processing unit 34.

The sensor interface 31 is an interface to receive the data acquired by the sensor system 13. The sensor interface 31 has an image data acquiring section 35, an acceleration data acquiring section 36, an attitude angle data acquiring section 37 and an attitude rate data acquiring section 38. The image data acquiring section 35 receives the image data from the image detecting section 17 and the acceleration data acquiring section 36 receives the acceleration data from the acceleration detecting section 18. Also, the attitude angle data acquiring section 37 receives the attitude angle data from the attitude angle detecting section 19 and the attitude rate data acquiring section 38 receives the attitude rate data from the attitude rate detecting section 20.

The control command interface 32 generates the throttling command 21, the gimbal steering command 22 and the RCS on/off command 23 according to the calculation result by the processing unit 34, and supplies the throttling command 21, the gimbal steering command 22 and the RCS on/off command 23 to the engine 11, the gimbal unit 15, and the RCS 16, respectively.

The storage unit 33 holds a program and data which are used for the guidance of the spacecraft. In the present embodiment, the storage unit 33 stores a navigation calculation module 41, a landing guidance calculation module 42, an attitude control calculation module 43 and landing guidance polynomial coefficient data 44.

Each of the navigation calculation module 41, the landing guidance calculation module 42 and the attitude control calculation module 43 is a program module in which program code executed by the processing unit 34 has been written. The navigation calculation module 41 is a module in which the program code to carry out a navigation operation has been written. The landing guidance calculation module 42 is a module in which the program code to carry out a landing guidance operation has been written. The attitude control calculation module 43 is a module in which the program code to carry out the attitude control operation has been written.

The landing guidance polynomial coefficient data 44 are data in which the coefficients of the polynomial used for the landing guidance calculation have been written. The polynomial used in the landing guidance calculation and the coefficients written in the landing guidance polynomial coefficient data 44 will be described later in detail.

Figure 4:
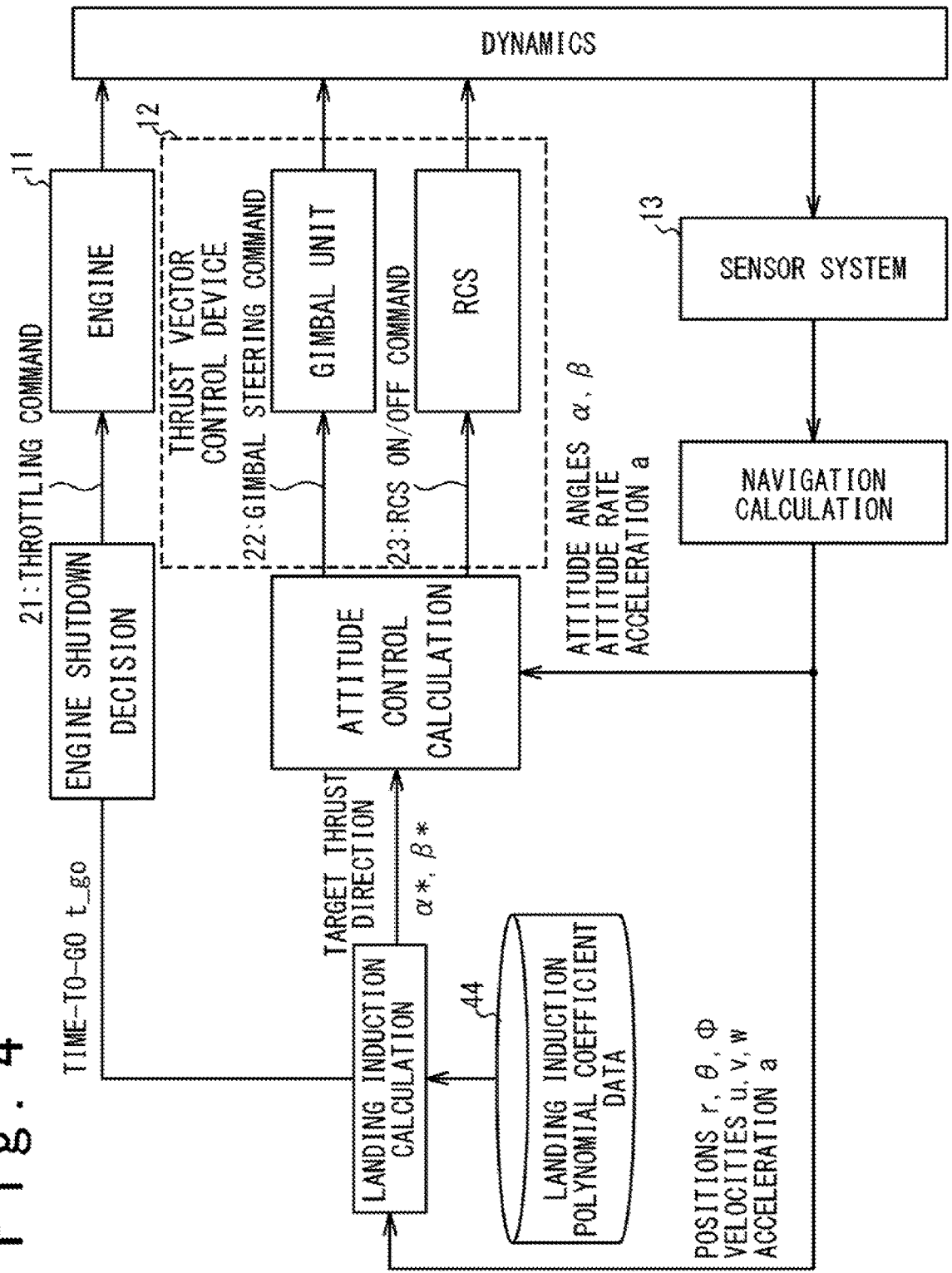
FIG. 4 is a control block diagram showing the contents of control carried out in the spacecraft in the embodiment.

FIG. 4 is a control block diagram showing the control carried out in the spacecraft.

The dynamics of the spacecraft is detected by the sensor system 13. As mentioned above, the image data, the acceleration data, the attitude angle data and the attitude rate data are acquired by the sensor system 13, but data of the dynamics are contained in these data.

The navigation calculation is carried out by using the image data, the acceleration data, the attitude angle data and the attitude rate data which are acquired by the sensor system 13. This navigation calculation is carried out by the processing unit 34 executing the program code written in the navigation calculation module 41. In the navigation calculation, the positions r, θ, and φ, the velocities u, v, and w, the acceleration a, the attitude angles α and β, and the attitude angle velocities (dα/dt, dβ/dt) in the spacecraft are acquired. In this case, the acceleration a is an acceleration of the spacecraft in the direction of the thrust generated by the engine 11 of the spacecraft 10 and is a scalar quantity.

The landing guidance calculation is carried out based on the positions r, θ, and φ, the velocities u, v, and w, and the acceleration a. This landing guidance calculation is carried out by processing unit 34 executing the program code written in the landing guidance calculation module 42. In the landing guidance calculation, the time-to-go t_go and target thrust vectors α* and β* are calculated. As mentioned above, the time-to-go t_go shows the combustion time of the engine 11 to be continued after that. In the present embodiment, the target thrust vectors α* and β* are written as target values of the attitude angles α and β.

A combustion stop determination is carried out based on the time-to-go t_go calculated in the landing guidance calculation. The program code to carry out the combustion stop determination is contained in the landing guidance calculation module 42. If the time-to-go t_go calculated in the landing guidance calculation indicates zero, it is determined that the combustion of the engine 11 should be stopped, and the combustion of the engine 11 is stopped by the throttling command 21.

Also, the attitude control calculation is carried out based on the target thrust vector α* and β* calculated in the landing guidance calculation, and the attitude angle α and β, the attitude rate and acceleration a of the spacecraft calculated in the navigation calculation, and the gimbal steering command 22 and the RCS on/off command 23 are generated. In the attitude control calculation, the gimbal steering command 22 and the RCS on/off command 23 are generated so that the attitude angles α and β of the spacecraft 10 are controlled to the target thrust vectors α* and β*.

In the landing guidance calculation, various state quantities can be used as an input. For example, the positions r, θ and φ and velocities u, v, and w of the spacecraft 10 acquired in the navigation calculation are basic state quantities of the spacecraft 10 and are used as the input of the landing guidance calculation. In order to improve the precision of the landing guidance calculation, it is possible to introduce other state quantities into the landing guidance calculation. Because the selection of the state quantities introduced into the landing guidance calculation influences the precision of the landing guidance, it is desirable to introduce an appropriate state quantity into the landing guidance calculation. Below, the state quantities are considered which should be introduced into the landing guidance calculation in the present embodiment.

First, in the landing guidance calculation in the present embodiment, the acceleration parameters A and B are introduced as the state quantities used as the input. Here, the acceleration parameters A and B are calculated as coefficients A and B obtained by fitting based on the acceleration a of the spacecraft detected by the acceleration detecting section 18 in each time of past, on the assumption that the following equation (1) is met between a reciprocal number 1/a of the acceleration of the spacecraft 10 and time t:

$$\frac{1}{a} = -At + B \tag{1}$$

Here, in the present embodiment, the time t is defined to be "0" at the start time of the powered descent phase F2. In the embodiment, the acceleration parameters A and B may be calculated by the least squares method from the reciprocal number 1/a of the acceleration a of the spacecraft 10 detected by the acceleration detecting section 18 in each time t of past.

Figure 5:
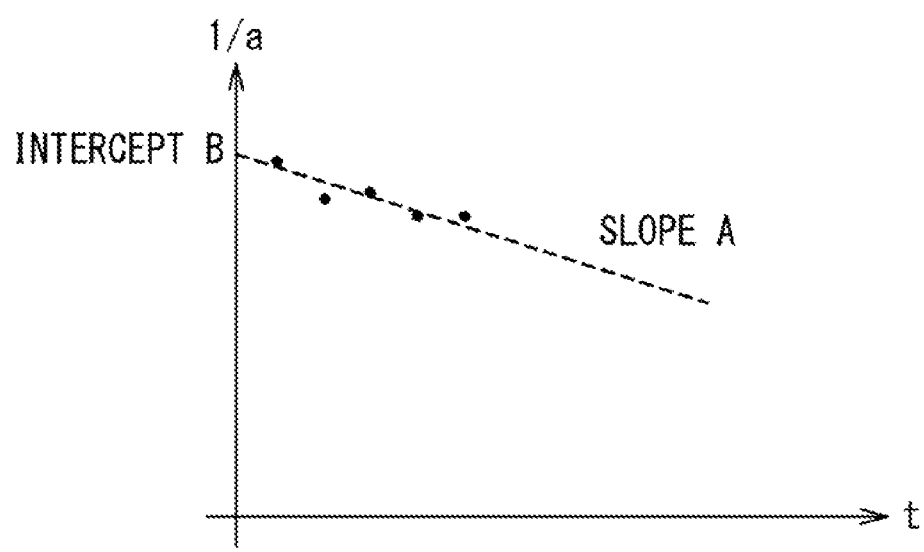
FIG. 5 is a diagram showing acceleration parameters A and B.

FIG. 5 is a diagram showing the acceleration parameters A and B. As understood from the equation (1), in the landing guidance calculation of the embodiment, the presupposition is placed that the reciprocal number 1/a is shown as the linear function of time t. The coefficient A is a slope of the graph showing a change of reciprocal number 1/a to the time t and the coefficient B is an intercept.

The presupposition that the reciprocal number 1/a is a linear function of time t is based on the following motion equation (2) which is met on the spacecraft 10:

$$a = \frac{T}{m} = \frac{T}{m_0 - qt} \tag{2}$$

where a is an acceleration of the spacecraft 10, T is a thrust which is generated by the engine 11, m is the mass of the spacecraft 10. Also, $m_0$ is an initial mass (a mass at the time when the powered descent phase F2 is started) of the spacecraft 10, q is a flow rate of the propellant combusted in the engine 11. The following equation (3) is obtained from the equation (2):

$$\frac{1}{a} = -\frac{1}{g_0 I_{sp}} t + \frac{m_0}{T} \tag{3}$$

where $g_0$ is a standard gravitational acceleration, $I_{sp}$ is a specific thrust of the engine 11. However, note that the following equation (4) is used to derive the equation (3):

$$T/q = g_0 I_{sp} \tag{4}$$

It could be understood from the comparison of the equation (1) and the equation (3) that the acceleration parameter A is a parameter depending on the specific thrust $I_{sp}$, the acceleration parameter B is a parameter depending on the initial mass $m_0$ of the spacecraft 10 and the thrust T. This means that by introducing the acceleration parameters A and B as the state quantities, the landing guidance corresponding to spacecraft errors, i.e. errors caused in the thrust, the specific thrust and the initial mass is possible. Thus, by introducing the acceleration parameters A and B as the state quantities, the landing guidance corresponding to the spacecraft errors can be carried out. This is effective to guide the spacecraft 10 correctly to a desired target point 3.

Second, in the landing guidance calculation of the present embodiment, a burn time variation d is introduced as a state quantity in case of calculation of the target thrust vectors $\alpha^*$ and $\beta^*$. The burn time variation d is a change quantity from a nominal combustion time $t_{nom}$ as a time period from the start of combustion of the engine 11 to the stop of the combustion. In the present embodiment, the burn time variation d is calculated from the current time t, the time-to-go t_go and the nominal combustion time $t_{nom}$ by using the following equation (5):

$$d = t + t\_go - t_{nom} \quad (5)$$

In the present embodiment, note that the time t coincides with the combustion time of the engine 11 after the start of the powered descent phase F2, since the time t is defined to be "0" at the start of powered descent phase F2. In this case, the nominal combustion time $t_{nom}$ is an initially planned combustion time of the engine 11, i.e. the combustion time of the engine 11 when the spacecraft 10 flies along a nominal orbit in the powered descent phase F2 (an initially planned orbit as an orbit of the spacecraft 10 in the powered descent phase F2). In the present embodiment, the nominal orbit is determined based on an orbit in which the fuel consumption of the engine 11 is smallest in case of guiding the spacecraft 10 to the target point 3 from the initial point 2 of powered descent phase, when any error does not exist in the positions, velocities, thrust, and specific thrust and initial mass of the spacecraft 10 at the start of powered descent phase F2. The determination of the nominal orbit and the nominal combustion time $t_{nom}$ will be described later in detail.

The burn time variation d is a parameter showing a fluctuation of the combustion time of the engine 11, i.e. the time for which the thrust is generated. The burn time variation d is a parameter suited to show a degree of deceleration of the spacecraft 10. It is effective to use the burn time variation d as the state quantity in the calculation of the target thrust vectors $\alpha^*$ and $\beta^*$ for the purpose of guiding the spacecraft 10 correctly to the desired target point 3.

Third, in the present embodiment, an initial cross range position error $\theta_0$ and an initial horizontal velocity error $w_0$ are introduced as the state quantities into the calculation of the target thrust vectors $\alpha^*$ and $\beta^*$. The initial cross range position error $\theta_0$ is a cross range angle $\theta$ at the time when the powered descent phase F2 is started, and the initial horizontal velocity error $w_0$ is a horizontal velocity w at the time when the powered descent phase F2 is started. In this case, note that the initial cross range position error $\theta_0$ and the initial horizontal velocity error $w_0$ are always used in the landing guidance calculation, in addition to the cross range angle $\theta$ and the horizontal velocity w of the spacecraft 10 acquired in the above-mentioned navigation calculation. By introducing the initial cross range position error $\theta_0$ and the initial horizontal velocity error $w_0$ as the state quantities, errors of the velocity and position in the cross range direction at the time of end of the powered descent phase F2 can be reduced.

In the present embodiment, the polynomial having the above-mentioned state quantities as variables is used in the landing guidance calculation of calculating the time-to-go t_go and the target thrust vectors $\alpha^*$ and $\beta^*$. The landing guidance polynomial coefficient data 44 stored in the storage unit 33 of the main control device 14 are data showing coefficients of the polynomial used for the calculation of the time-to-go t_go and the target thrust vectors $\alpha^*$ and $\beta^*$.

The polynomial used for the landing guidance calculation can be generally shown by the following equation (6):

$$y = \sum_{i_n=0}^{m_n} \cdots \sum_{i_1=0}^{m_1} \left( a_{i_1,\cdots,i_n} \prod_{k=1}^{n} x_k^{i_k} \right) \quad (6)$$

where y is a guidance command, and $x_k$ is a state quantity. Also, $m_k$ is a maximum order of the state quantity $x_k$ and $a_{i_1}, \ldots, _{i_n}$ are coefficients. In the present embodiment, the guidance command y is either of the time-to-go t_go and the target thrust vectors $\alpha^*$ and $\beta^*$. Also, of the positions r, $\theta$, and $\varphi$ of the spacecraft 10, the velocities u, v, and w of the spacecraft 10, the acceleration parameters A and B, the burn time variation d, the initial cross range position error $\theta_0$ and the initial horizontal velocity error $w_0$, ones necessary to calculate the guidance command y are used as the state quantities $x_k$.

To reduce a computation quantity, a constraint of the following equation (7) may be provided for the order of each state quantity of the polynomial:

$$\sum_{k=1}^{n} i_k \leq N \quad (7)$$

In the present embodiment, regarding the polynomial for calculating the time-to-go t_go (that is, the polynomial in which the guidance command y is the time-to-go t_go), the acceleration parameters A and B are selected in addition to the positions r, $\theta$, and $\varphi$ and the velocities u, v, and w of the spacecraft as the state quantities $x_k$. The coefficients (the coefficients $a_{i_1}, \ldots, _{i_n}$ of the equation (6)) of the polynomial used to calculate the time-to-go t_go from these state quantities have been stored as the landing guidance polynomial coefficient data 44.

Also, regarding the polynomial used to calculate the target thrust vector $\alpha^*$ (that is, the polynomial in which the guidance command y is the target thrust vector $\alpha^*$), the acceleration parameters A and B, the burn time variation d, the initial cross range position error $\theta_0$ and the initial horizontal velocity error $w_0$ are selected as the state quantities $x_k$ in addition to the positions r, $\theta$, and $\varphi$ and velocities u, v, and w of the spacecraft. The coefficients of the polynomial for calculating the target thrust vector $\alpha^*$ from these state quantities have been stored in the landing guidance polynomial coefficient data 44.

Similarly, regarding the polynomial used to calculate the target thrust vector $\beta^*$ (that is, the polynomial in which the guidance command y is the target thrust vector $\beta^*$), the acceleration parameters A and B, the burn time variation d, the initial cross range position error $\theta_0$ and the initial horizontal velocity error $w_0$ are selected as the state quantities $x_k$ in addition to the positions r, $\theta$, and $\varphi$ and the velocities u, v, and w of the spacecraft. The coefficients of the polynomial for calculating the target thrust vector $\beta^*$ from these state quantities have been stored in the landing guidance polynomial coefficient data 44.

Figure 6:
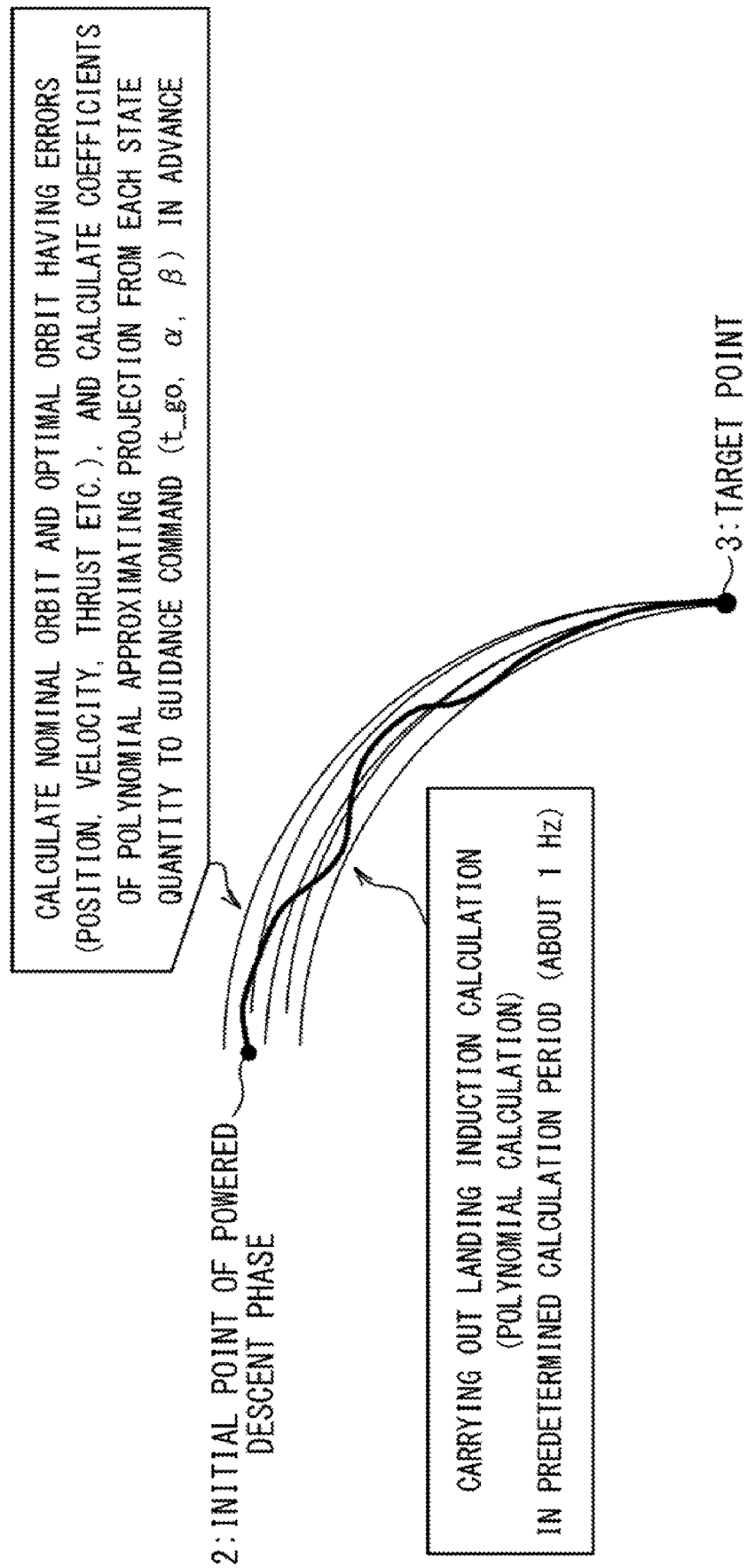
FIG. 6 is a diagram showing the concept of landing guidance calculation using a polynomial in the embodiment.

FIG. 6 is a diagram showing a concept of landing guidance calculation using the polynomial in the present embodiment. Before the powered descending of the spacecraft is actually started, the coefficients of the polynomial used to calculate the time-to-go t_go and the target thrust vectors α* and β* are calculated and are stored as the landing guidance polynomial coefficient data 44, as a preliminary preparation. The calculation of the coefficients of the polynomial is carried out in advance (e.g. by using a computer installed in a ground station on the earth). The calculation of the coefficients of the polynomial will be described later in detail.

When the operation to make the spacecraft land actually on the gravitational body is started, and the spacecraft reaches an initial point 2 of powered descent phase and shifts to the powered descent phase F2, the time-to-go t_go and the target thrust vectors α* and β* in each time t are calculated from the state quantities $x_k$ in each time t by using the above-mentioned polynomial. The calculation of time-to-go t_go and the target thrust vectors α* and β* is carried out in an appropriately previously determined calculation interval (e.g. 1 second).

According to such a landing guidance calculation, it is only necessary to carry out an operation of the polynomial for every calculation interval for the calculation of the time-to-go t_go and the target thrust vectors α* and β* after the spacecraft of the present embodiment shifts actually to the powered descent phase F2. Therefore, a computation quantity in each calculation interval can be reduced and the computation load of the processing unit 34 can be reduced. This facilitates the implementing of the processing unit 34 of the spacecraft 10.

Figure 7:
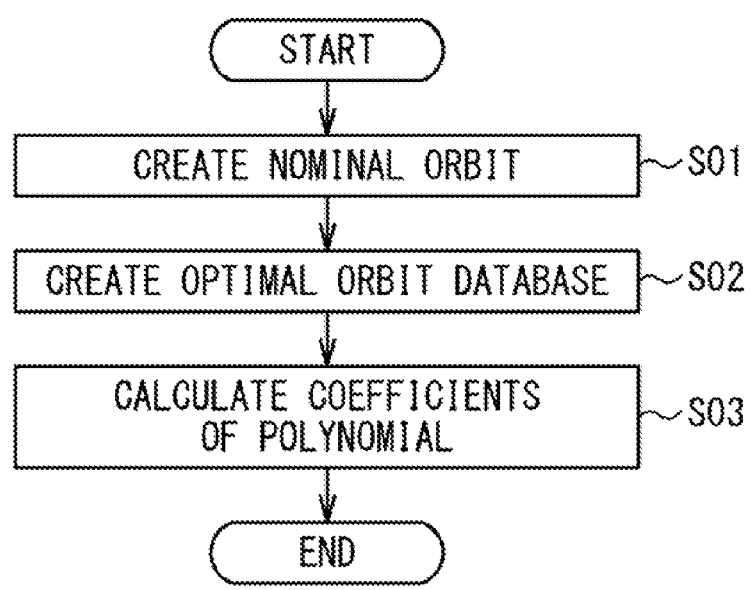
FIG. 7 is a flow chart showing the procedure of calculating coefficients of the polynomial used for calculation of time-to-go and target thrust vector in the embodiment.

FIG. 7 is a flow chart showing a procedure of calculating coefficients of a polynomial used for the calculation of time-to-go t_go and target thrust vectors α* and β*.

In the calculation of the coefficients of the polynomial, first, a nominal orbit is set (Step S01). In the present embodiment, if initial errors on the position and velocity of the spacecraft 10 do not exist at the start of powered descent phase F2, the nominal orbit is determined based on an orbit by which the fuel consumption in the engine 11 becomes the smallest when guiding the spacecraft 10 to the target point 3 from the initial point 2 of powered descent phase.

The nominal orbit is created, supposing that any errors of position and velocity in the cross range direction and any disturbance acting on the position and velocity in the cross range direction do not exist. That is, the nominal orbit is calculated, supposing that the nominal orbit is in the XZ plane shown in FIG. 2. In this case, the cross range angle θ, the horizontal velocity w and the attitude angle β are always zero, and therefore, the creation of the nominal orbit may be carried out based on the 2-dimensional coordinate system shown in FIG. 8.

The creation of the nominal orbit can be resulted in an optimization problem of calculating an orbit from the initial point 2 of powered descent phase to the target point 3 and the down range angle φ at the target point 3, in which the fuel consumption is minimized. The orbit calculated by solving this optimization problem is the nominal orbit. The nominal orbit can be expressed as a history of the attitude angle α (attitude angle α at each time t) of the spacecraft 10 which realizes the nominal orbit.

Figure 8:
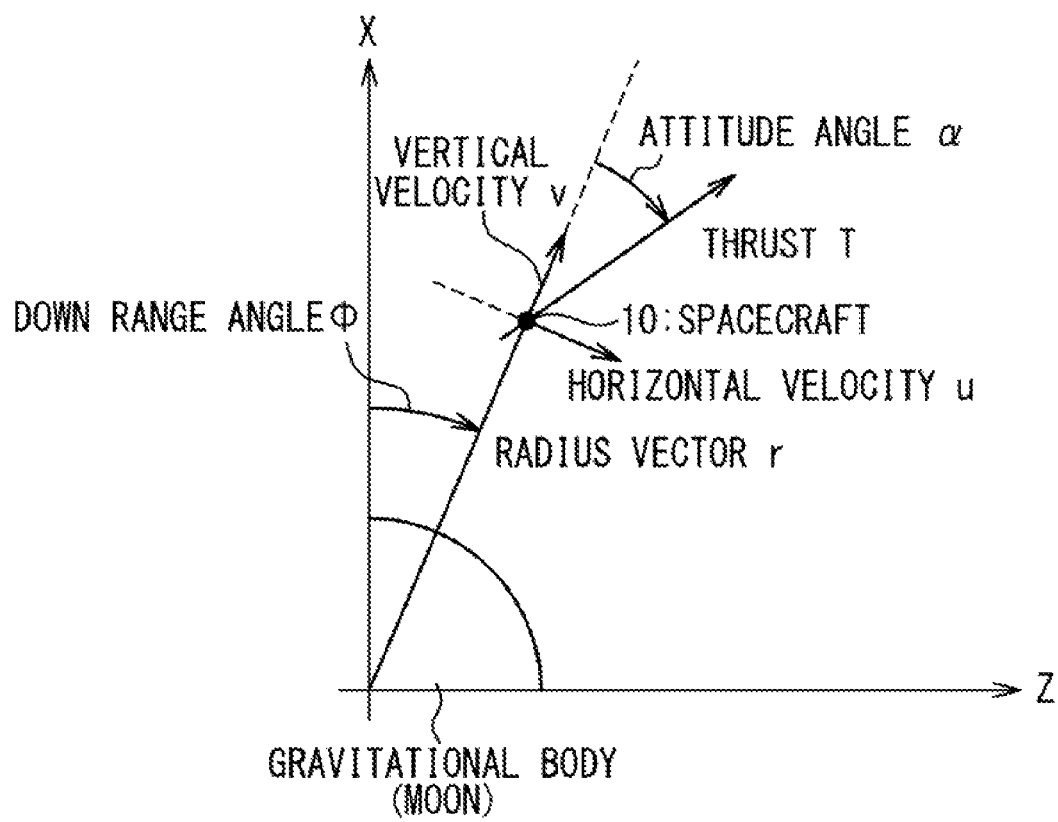
FIG. 8 is a diagram showing a 2-dimensional coordinate system used for producing of a nominal orbit.

In the 2-dimensional coordinate system shown in FIG. 8, the following motion equations (8)-(11) are satisfied with respect to the spacecraft:

$$\frac{dr}{dt} = v \tag{8}$$

$$\frac{d\phi}{dt} = \frac{u}{r} \tag{9}$$

$$\frac{dv}{dt} = \frac{T}{m}\cos\alpha - \frac{\mu}{r^2} + \frac{u^2}{r} \tag{10}$$

$$\frac{du}{dt} = \frac{T}{m}\sin\alpha - \frac{vu}{r} \tag{11}$$

where T is a thrust generated by the engine 11, μ is a gravitational constant of the gravitational body and m is a mass of the spacecraft.

Here, the acceleration a can be expressed by the following equation (12):

$$a = \frac{T}{m} = \frac{T}{m_0 - qt} \tag{12}$$

where $m_0$ is an initial mass of the spacecraft (a mass at the time when the powered descent phase F2 is started), and q is a flow rate of the propellant combusted in the engine 11. The time t is defined as the time when the powered descent phase F2 is started is zero.

Supposing that the minimization of fuel consumption is identical to the minimization of combustion time, an evaluation function J of the optimization problem can be expressed by the following equation (13):

$$J = \int_0^{t_{nom}} 1 \, dt = t_{nom} \tag{13}$$

where $t_{nom}$ is a nominal combustion time, that is, a time for which the combustion is carried out in the engine 11 while the spacecraft 10 is guided along the nominal orbit in the powered descent phase F2.

In this case, Hamiltonian H is shown by the following equation (14):

$$H = 1 + \lambda_1 v + \lambda_2 \frac{u}{r} + \lambda_3 \left(a \cos\alpha - \frac{\mu}{r^2} + \frac{u^2}{r}\right) + \lambda_4 \left(a \sin\alpha - \frac{vu}{r}\right) \tag{14}$$

where $\lambda_1, \lambda_2, \lambda_3, \lambda_4$ are accompanying variables introduced to solve the optimization problem.

As mentioned above, the history of attitude angle α of the spacecraft 10 to realize the nominal orbit in which the fuel consumption becomes smallest (the combustion time is shortest) is a solution to be solved in this optimization problem. The requirement condition to minimize the fuel consumption is that the Hamiltonian H to a becomes smallest. The condition when the Hamiltonian H to a becomes smallest is represented by the following equation (15a) and the equation (15b) obtained from this equation (15a):

$$\frac{\partial H}{\partial \alpha} = -\lambda_3 a \sin\alpha + \lambda_4 a \sin\alpha = 0 \tag{15a}$$

$$\tan\alpha = \frac{\lambda_4}{\lambda_3} \tag{15b}$$

where two alphas (α) meeting the equation (15b) exist: one of them minimizes the Hamiltonian H and the other maximizes the Hamiltonian H. In the calculation of creating the nominal orbit, a which minimizes the Hamiltonian H is selected.

The differential equations of accompanying variables $\lambda_1$, $\lambda_2$, $\lambda_3$, and $\lambda_4$ are the following equations (16)-(19):

$$\frac{d\lambda_1}{dt} = -\frac{\partial H}{\partial r} = \lambda_2 \frac{u}{r^2} - \lambda_3\left(\frac{2\mu}{r^3} - \frac{u^2}{r^2}\right) - \lambda_4 \frac{vu}{r^2} \quad (16)$$

$$\frac{d\lambda_2}{dt} = -\frac{\partial H}{\partial \phi} = 0 \quad (17)$$

$$\frac{d\lambda_3}{dt} = -\frac{\partial H}{\partial v} = -\lambda_1 + \lambda_4 \frac{u}{r} \quad (18)$$

$$\frac{d\lambda_4}{dt} = -\frac{\partial H}{\partial u} = -\lambda_2 \frac{1}{r} - \lambda_3 \frac{2u}{r} + \lambda_4 \frac{v}{r} \quad (19)$$

Here, it could be understood from the equation (17) that the accompanying variable $\lambda_2$ may be a constant number. Therefore, the following equation (20) is satisfied for the accompanying variable $\lambda_2$:

$$\lambda_2 = C_2 \quad (20)$$

where $C_2$ is a constant number.

The termination conditions of the Hamiltonian H and the accompanying variables are shown by the following equations (21) and (22):

$$H(t_{nom}) = 0 \quad (21)$$

$$\lambda_i(t_{nom}) = \left[\sum_j v_j \frac{\partial \Psi_j}{\partial x_i}\right]_{t=t_{nom}} \quad (22)$$

where $\Psi_j(x)$ is a function showing a difference between a current position velocity at each time and the position velocity to be achieved at the target point 3. From the condition that the difference between both becomes 0 at time $t=t_{nom}$, the following equations (23)-(26) are established:

$$\Psi_1(x) = r(t_{nom}) - r_f = 0 \quad (23)$$

$$\Psi_2(x) = \varphi(t_{nom}) - \varphi_f = 0 \quad (24)$$

$$\Psi_3(x) = v(t_{nom}) - v_f = 0 \quad (25)$$

$$\Psi_4(x) = u(t_{nom}) - u_f = 0 \quad (26)$$

where $r(t_{nom})$, $\varphi(t_{nom})$, $v(t_{nom})$, and $u(t_{nom})$ are the positions and the velocities at time $t_{nom}$, $r_f$, $\varphi_f$, $v_f$, and $u_f$ show the positions and velocities to be achieved at the target point 3. Also, $v_j$ is an undetermined Lagrange constant.

Because the flight down range angle $\varphi_f$ during the powered descending should be determined so as to minimize the fuel consumption (to minimize the combustion time), the optimization problem to be solved is not restrained by the termination condition of the down range angle $\varphi$. Therefore, supposing that the boundary condition about $\varphi$ is free, the following equation (27) is obtained:

$$\lambda_2(t_f) = \left[v_1 \frac{\partial \Psi_1}{\partial \phi} + v_3 \frac{\partial \Psi_3}{\partial \phi} + v_4 \frac{\partial \Psi_4}{\partial \phi}\right] = 0 = C_2 \quad (27)$$

Therefore, it may be $\lambda_2 = 0$.

Thus, the Hamiltonian H and the differential equations of the accompanying variables can be rewritten by the following equations (28)-(31):

$$H = 1 + \lambda_1 v + \lambda_3\left(a \cos \alpha - \frac{\mu}{r^2} + \frac{u^2}{r}\right) + \lambda_4\left(a \sin \alpha - \frac{vu}{r}\right) \quad (28)$$

$$\frac{d\lambda_1}{dt} = -\lambda_3\left(\frac{2\mu}{r^3} - \frac{u^2}{r^2}\right) - \lambda_4 \frac{vu}{r^2} \quad (29)$$

$$\frac{d\lambda_3}{dt} = -\lambda_1 + \lambda_4 \frac{u}{r} \quad (30)$$

$$\frac{d\lambda_4}{dt} = -\lambda_3 \frac{2u}{r} + \lambda_4 \frac{v}{r} \quad (31)$$

where the number of unknown values is four of the initial values of three accompanying variables $\lambda_1$, $\lambda_3$, and $\lambda_4$ and the nominal combustion time $t_{nom}$.

From above, a Newton's method is applied to seven differential equations of four motion equations (equation (8) to equation (11)) and three differential equations (equations (29), (30), and (31)) of the accompanying variables of the Hamiltonian H, and unknown values when the termination conditions (the equations (21), (23), (25), and (26)) of the Hamiltonian H and three positions and velocities are zero are determined while changing four unknown values ($\lambda_1$, $\lambda_3$, $\lambda_4$, and $t_{nom}$). Thus, the flight down range angle $\varphi_f$ and the nominal orbit when the fuel consumption becomes minimum (that is, the history of the attitude angle $\alpha$ of the spacecraft 10 to realize the nominal orbit) can be obtained. In this calculation, at the same time, the nominal combustion time $t_{nom}$, i.e. the time for which the combustion is carried out in the engine 11 when the spacecraft is guided along the nominal orbit in the powered descent phase F2 can be obtained.

In the whole landing sequence, the position of the target point 3 is determined from a landing planned point, and moreover, the position of the initial point 2 of powered descent phase is determined in consideration of error tolerance and so on based on the determined position of the target point 3 and the flight down range angle $\varphi_f$ in the minimum fuel consumption obtained by solving the above-mentioned optimization problem. Thus, an orbit (the nominal orbit) for the spacecraft 10 to be guided to the target point 3 from the initial point 2 of powered descent phase is determined. Moreover, the orbit in the coast phase F1 is determined from the determined position of the initial point 2 of powered descent phase, and a position for the spacecraft to de-orbit from the orbit 1 based on the determined orbit in the coast phase F1 is determined.

Next, an optimal orbit database is created (Step S02). In the actual operation of spacecraft, various errors can exist in the position, the velocity, the mass, the thrust and the specific thrust of the spacecraft at the start of powered descent phase F2. The optimal orbit database is a database describing an optimal orbit (the orbit in the minimum fuel consumption) calculated for each of combinations of errors at the start of powered descent phase F2. The optimal orbit for each combination of errors is described in the optimal orbit database. Each optimal orbit is described in the optimal orbit database as the history of the attitude angles $\alpha$ and R of the spacecraft which realizes the optimal orbit (the history of attitude angles $\alpha$ and $\beta$ at each time t). It is desirable that the optimal orbits for many combinations of errors are described in the optimal orbit database. In the embodiment, combinations of errors which are generated as uniform random numbers within a permissible error range may be used.

In the embodiment, an error range is determined for each of the radius vector r, the cross range $r_m\theta$, the down range $r_m\varphi$, the horizontal velocity u, the vertical velocity v, the horizontal velocity w, the initial mass $m_0$, the thrusts T and the specific thrust $I_{sp}$, and each of the combinations of errors may contain an error, which is determined within the error range, of each of the positions r, $r_m\theta$, and $r_m\varphi$, the velocities u, v, and w, the initial mass $m_0$, the thrusts T and the specific thrust $I_{sp}$ at the start of powered descent phase F2. Here, the cross range $r_m\theta$ is a product of the cross range angle $\theta$ and the radius $r_m$ of the gravitational body to be landed on. The down range $r_m\varphi$ is a product of the down range angle $\varphi$ and the radius $r_m$ of the gravitational body to be landed on.

In the creation of the optimal orbit database, it is supposed that the cross range angle $\theta$ and the horizontal velocity w can be non-zero. Therefore, the optimal orbit database is created based on the motion equations established in the three-dimensional coordinate system shown in FIG. 2. In the three-dimensional coordinate system shown in FIG. 2, the following motion equations (32)-(37) are established:

$$\frac{dr}{dt} = v \tag{32}$$

$$\frac{d\theta}{dt} = \frac{w}{r\cos\phi} \tag{33}$$

$$\frac{d\phi}{dt} = \frac{u}{r} \tag{34}$$

$$\frac{dv}{dt} = \frac{T}{m}\cos\beta\cos\alpha - \frac{\mu}{r^2} + \frac{u^2+w^2}{r} \tag{35}$$

$$\frac{dw}{dt} = \frac{T}{m}\sin\beta - \frac{vw}{r} + \frac{uw}{r}\tan\phi \tag{36}$$

$$\frac{du}{dt} = \frac{T}{m}\cos\beta\sin\alpha - \frac{vu}{r} - \frac{w^2}{r}\tan\phi \tag{37}$$

where $\mu$ is the gravitational constant, T is the thrust T generated by the engine 11 and m is the mass of the spacecraft 10. Also, note that the above-mentioned equation (12) is satisfied regarding the acceleration a.

The calculation of each optimal orbit to be described in the optimal orbit database can be resulted in the optimization problem to calculate the orbit in the minimum fuel consumption. Below, the calculation method of the optimal orbit in the minimum fuel consumption on a combination of errors (a combination of errors of the position, the velocity, the mass, and the specific thrust of the spacecraft) will be considered.

Supposing that the minimization of fuel consumption is the same as the minimization of combustion time, the evaluation function J of the optimization problem can be shown by the equation (38):

$$J = \int_0^{t_f} 1\, dt = t_f \tag{38}$$

where $t_f$ is the combustion time, i.e. the time for which the combustion is carried out in the engine 11 when the spacecraft 10 is guided along the optimal orbit in the powered descent phase F2.

In this case, the Hamiltonian H is shown by the following equation (39):

$$H = 1 + \lambda_1 v + \lambda_2 \frac{w}{r\cos\phi} + \lambda_3 \frac{u}{r} + \lambda_4\left(a\cos\beta\cos\alpha - \frac{\mu}{r^2} + \frac{u^2+w^2}{r}\right) + \\ \lambda_5\left(a\sin\beta - \frac{vw}{r} + \frac{uw}{r}\tan\phi\right) + \\ \lambda_6\left(a\cos\beta\sin\alpha - \frac{vu}{r} - \frac{w^2}{r}\tan\phi\right) \tag{39}$$

where $\lambda_1$, $\lambda_2$, $\lambda_3$, $\lambda_4$, $\lambda_5$, and $\lambda_6$ are accompanying variables introduced to solve the optimization problem.

Data to be obtained in this optimization problem are a history of attitude angles $\alpha$ and $\beta$ of the spacecraft 10 to realize the optimal orbit in the minimum fuel consumption (the minimum combustion time). The requirement to minimize the fuel consumption is that the Hamiltonian H takes minimum values for ($\alpha$, $\beta$).

First, the condition that the Hamiltonian H takes the minimum value to $\alpha$ is expressed by the equation (40), and moreover, the equation (41) is obtained from the equation (40) as follows:

$$\frac{\partial H}{\partial \alpha} = -\lambda_4 a\cos\beta\sin\alpha + \lambda_6 a\cos\beta\cos\alpha = 0 \tag{40}$$

$$\tan\alpha = \frac{\lambda_6}{\lambda_4} \tag{41}$$

Here, two alphas ($\alpha$) which meet the equation (41) exist; $\alpha$ which minimizes the Hamiltonian H and $\alpha$ which maximizes the Hamiltonian H. In the calculation of the optimal orbit, $\alpha$ which minimizes the Hamiltonian H is selected.

Also, the condition that the Hamiltonian H takes a minimum value for $\beta$ is expressed by the equation (42), and moreover, the equation (43) is obtained from the equation (42) as follows:

$$\frac{\partial H}{\partial \beta} = -\lambda_4 a\sin\beta\cos\alpha + \lambda_5 a\cos\beta - \lambda_6 a\sin\beta\sin\alpha = 0 \tag{42}$$

$$\tan\beta = \frac{\lambda_5}{\lambda_4\cos\alpha + \lambda_6\sin\alpha} \tag{43}$$

where, $-\Pi/2 < \beta < \Pi/2$.

The differential equations (44)-(49) of the accompanying variables $\lambda_1$ to $\lambda_6$ are as follows:

$$\frac{d\lambda_1}{dt} = -\frac{\partial H}{\partial r} = \frac{1}{r^2}\left\{\lambda_2 \frac{w}{\cos\phi} + \lambda_3 u + \lambda_4\left(-\frac{2\mu}{r} + u^2 + w^2\right) + \right. \\ \left. \lambda_5(-vw + uw\tan\phi) - \lambda_6(vu + w^2\tan\phi)\right\} \tag{44}$$

$$\frac{d\lambda_2}{dt} = -\frac{\partial H}{\partial \theta} = 0 \tag{45}$$

$$\frac{d\lambda_3}{dt} = -\frac{\partial H}{\partial \phi} = \frac{w}{r\cos^2\phi}(-\lambda_2\sin\phi - \lambda_5 u + \lambda_6 w) \tag{46}$$

$$\frac{d\lambda_4}{dt} = -\frac{\partial H}{\partial v} = -\lambda_1 + \lambda_5 \frac{w}{r} + \lambda_6 \frac{u}{r} \tag{47}$$

-continued $$\frac{d\lambda_5}{dt} = -\frac{\partial H}{\partial w} = \frac{1}{r}\left\{-\frac{\lambda_2}{\cos\phi} - 2\lambda_4 w + \lambda_5(v - u\tan\phi) + 2\lambda_6 w\tan\phi\right\} \quad (48)$$

$$\frac{d\lambda_6}{dt} = -\frac{\partial H}{\partial u} = \frac{1}{r}(-\lambda_3 - 2\lambda_4 u - \lambda_5 w\tan\phi + \lambda_6 v) \quad (49)$$

The termination conditions of the Hamiltonian H and the accompanying variables are shown by the following equations (50)-(51):

$$H(t_f) = 0 \quad (50)$$

$$\lambda_i(t_f) = \left[\sum_j v_j \frac{\partial \Psi_j}{\partial x_i}\right]_{t=t_f} \quad (51)$$

where $\Psi_j(x)$ is a function showing a difference at each time between a current position and velocity and the position and velocity to be achieved at the target point 3. From the condition that the difference between both becomes zero at time $t=t_f$, the following equations (52)-(57) are established:

$$\Psi_1(x) = r(t_f) - r_f = 0 \quad (52)$$

$$\Psi_2(x) = \theta(t_f) - \theta_f = 0 \quad (53)$$

$$\Psi_3(x) = \varphi(t_f) - \varphi_f = 0 \quad (54)$$

$$\Psi_4(x) = v(t_f) - v_f = 0 \quad (55)$$

$$\Psi_5(x) = w(t_f) - w_f = 0 \quad (56)$$

$$\Psi_6(x) = u(t_f) - u_f = 0 \quad (57)$$

where $r(t_f)$, $\theta(t_f)$, $\varphi(t_f)$, $v(t_f)$, $w(t_f)$, $u(t_f)$ show the positions and velocities at time $t_f$, and $r_f$, $\theta f$, $\varphi_f$, $v_f$, $w_f$, $u_f$ show the positions and velocities to be achieved at the target point 3. Also, $v_j$ is an undetermined Lagrange constant.

Here, the unknown values are seven of the initial values of six accompanying variables $\lambda_1$-$\lambda_6$ and the combustion time $t_f$.

From the above, the Newton's method is applied to 12 differential equations of the six motion equations (the equation (32) to the equation (37)) and six differential equations (the equations (44)-(49)) of the accompanying variables of the Hamiltonian H, and unknown values are determined when the termination conditions (the equations (50), (52)-(57)) of the Hamiltonian H and the six positions and velocities are "0" while changing seven unknown values ($\lambda_1$-$\lambda_1$, $t_f$) Thus, the optimal orbit in the minimum fuel consumption (that is, the history of attitude angles α and β of the spacecraft 10 which realizes the optimal orbit) can be obtained.

Moreover, the coefficients of the polynomial are calculated by using the optimal orbit database (Step S03). The coefficients of the polynomial are calculated as follows.

First, data are sampled in a constant interval from the optimal orbit which has been described in the optimal orbit database, and state quantities at each time are calculated from the sampled data. Moreover, a mapping to the time-to-go t_go and the attitude angles α and β is calculated from the state quantities at each time. This mapping shows a correspondence relation of the state quantity and the time-to-go t_go and the target thrust vectors α* and β* when guiding the spacecraft 10 along the optimal orbit. The target thrust vectors α* and β* are expressed as the target values of the attitude angles α and β.

In the present embodiment, the state quantities which are used for the calculation of the time-to-go t_go are the positions r, θ, and φ, the velocities u, v, and w, and the acceleration parameters A and B. Therefore, regarding the time-to-go t_go, the mapping to the time-to-go t_go from the positions r, θ, and φ, the velocities u, v, and w, and the acceleration parameters A and B is calculated.

On the other hand, the state quantities which are used for the calculation of the target thrust vectors α* and β* are the positions r, θ, and φ, the velocities u, v, and w, the acceleration parameters A and B, the burn time variation d, the initial cross range position error $\theta_0$ and the initial horizontal velocity error $w_0$. Therefore, regarding the target thrust vectors α* and β*, there is calculated the mapping to the attitude angles α and β from the positions r, θ, and φ, the velocities u, v, and w, the acceleration parameters A and B, the burn time variation d, and the initial cross range position error $\theta_0$, and the initial horizontal velocity error $w_0$.

For example, when the optimal orbits for the combinations of errors of 500 cases are described in the optimal orbit database, if the mapping to the time-to-go t_go and the attitude angles α and β from the state quantities at the time of 240 is calculated for each optimal orbit, the mapping of 120,000 (=500×240) is calculated.

Moreover, regarding the state equations of the equation (6) as the simultaneous linear equations having the coefficient $a_{i1}, \ldots, a_{in}$ of each term as a variable, the coefficients $a_{i1}, \ldots, a_{in}$ of the polynomial are calculated as the minimum square solution of the simultaneous linear equations by using a pseudo-inverse matrix. Generally, the pseudo-inverse matrix can be determined by a method of the singular value resolution and so on. The coefficients of the polynomial are calculated for each of the time-to-go t_go and the attitude angles α and β. In this way, by calculating the coefficients of the polynomial, it is possible to approximate the mapping for determining the time-to-go t_go and the target thrust vectors α* and β* as the polynomial. The calculated coefficients of the polynomial are stored in the storage unit 33 of the main control device 14 as the landing guidance polynomial coefficient data 44.

Figure 9:
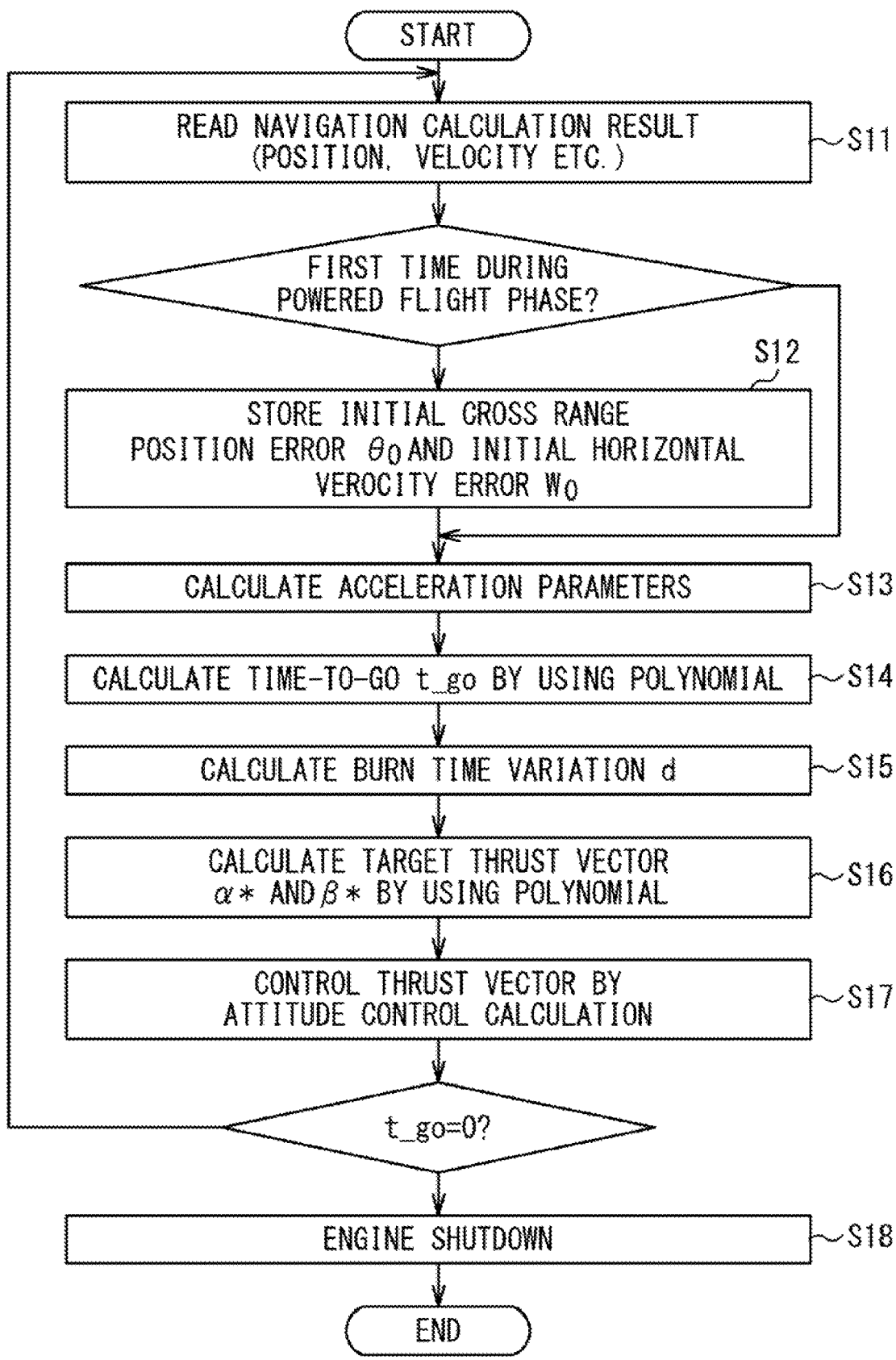
FIG. 9 is a flow chart showing a landing guidance calculation procedure in a powered descent phase F2 in the embodiment.

FIG. 9 is a flow chart showing the procedure of landing guidance calculation in the powered descent phase F2. As mentioned above, when the powered descent phase F2 is started, the throttling command 21 is generated to instruct the start of combustion of the engine 11 and the combustion of the engine 11 is started in response to the throttling command 21. In the landing guidance calculation of the powered descent phase F2, the time-to-go t_go and the target thrust vectors α* and β* are calculated using the polynomial. Note that the coefficients of a polynomial used for the calculation of time-to-go t_go and target thrust vectors α* and β* are described in the landing guidance polynomial coefficient data 44.

When the landing guidance calculation in the powered descent phase F2 is started, a navigation calculation result, i.e. the positions r, θ, and φ, the velocities u, v, and w, the attitude angles α and β, the attitude rate, and the acceleration a which are obtained through the navigation calculation are read into the landing guidance calculation module 42 (Step S11).

In the first calculation, the cross range angle θ and the horizontal velocity w which are obtained by the navigation calculation are saved as the initial cross range position error $\theta_0$ and the initial horizontal velocity error $w_0$ (Step S12). The initial cross range position error $\theta_0$ and the initial horizontal velocity error $w_0$ which are obtained at the step S12 are always used for the calculation of target thrust vectors $\alpha^*$ and $\beta^*$, after that.

Next, the acceleration parameters A and B are calculated based on the acceleration a which is obtained by the navigation calculation (Step S13). As mentioned above, the acceleration parameters A and B are calculated by fitting from the acceleration a of the spacecraft 10 detected by the acceleration detecting section 18 at each time of past (for example, by the least squares method), supposing that the relation of the above-mentioned equation (1) is satisfied between a reciprocal number 1/a of the acceleration of the spacecraft 10 and time t.

Moreover, the time-to-go t_go is calculated (Step S14). The time-to-go t_go is calculated by using the above-mentioned polynomial. As the state quantities of the polynomial which are used for the calculation of time-to-go t_go, the acceleration parameters A and B obtained at the step S13 are used in addition to the positions r, $\theta$, and $\varphi$, and the velocities u, v, and w, which are obtained by the navigation calculation. As mentioned above, by using the acceleration parameters A and B as the state quantities, the landing guidance corresponding to a spacecraft error can be carried out. The coefficients of the polynomial have been described in the landing guidance polynomial coefficient data 44 of the storage unit 33. The coefficients which have been described in the landing guidance polynomial coefficient data 44 are read and are used for the calculation of time-to-go t_go.

Moreover, the burn time variation d is calculated based on the time-to-go t_go calculated at the step S14 (Step S15). As mentioned above, in the present embodiment, the burn time variation d is calculated according to the above-mentioned equation (5).

Moreover, the target thrust vectors $\alpha^*$ and $\beta^*$ are calculated (Step S16). The target thrust vectors $\alpha^*$ and $\beta^*$ are calculated by using the above-mentioned polynomial. As the state quantities (variables) of the polynomial which are used for the calculation of the target thrust vectors $\alpha^*$ and $\beta^*$, the acceleration parameters A and B obtained at the step S13, the burn time variation d obtained at the step S15, and the initial cross range position error $\theta_0$ and the initial horizontal velocity error $w_0$ stored at the step S12 are used in addition to the positions r, $\theta$, and $\varphi$ and the velocities u, v, and w, which are obtained by the navigation calculation. Also, the coefficients of the polynomial are described in the landing guidance polynomial coefficient data 44 of the storage unit 33, and the coefficients described in the landing guidance polynomial coefficient data 44 are read and used for the calculation of the target thrust vectors $\alpha^*$ and $\beta^*$.

Moreover, the attitude control calculation is carried out by the attitude control calculation module 43 based on the target thrust vectors $\alpha^*$ and $\beta^*$ calculated at the step S16, so that the thrust vector of the spacecraft 10 is controlled (Step S17). The control of the thrust vector of the spacecraft 10 is carried out by the gimbal steering command 22 or the RCS on/off command 23 or the both. The gimbal steering command 22 and the RCS on/off command 23 are generated in the thrust vector of the spacecraft 10, so that the attitude angles $\alpha$ and $\beta$ coincide with the target thrust vectors $\alpha^*$ and $\beta^*$.

The above calculation is repeatedly carried out until the time-to-go t_go calculated at the step S14 becomes zero.

When the time-to-go t_go becomes zero, the combustion of the engine 11 is stopped (Step S18). When the time-to-go t_go becomes zero, the throttling command 21 to instruct to stop the combustion.

is transmitted to the engine 11, and the engine 11 stops the combustion in response to the throttling command 21. Above, the landing guidance calculation completes.

As described above, in the landing guidance calculation of the present embodiment, the acceleration parameters A and B are introduced as the state quantities. Thus, the landing guidance corresponding to the spacecraft error (for example, errors generated to the initial mass and the specific thrust which are assumed in the landing guidance) is realized.

Also, in the landing guidance calculation of the present embodiment, the burn time variation d is introduced as one state quantity for calculation of the target thrust vectors $\alpha^*$ and $\beta^*$. Thus, errors of the position and velocity of the spacecraft 10 at the end of powered descent phase F2 are reduced.

Moreover, in the landing guidance calculation of the present embodiment, the initial cross range position error $\theta_0$ and the initial horizontal velocity error $w_0$ are introduced as state quantities for calculation of the target thrust vectors $\alpha^*$ and $\beta^*$. Thus, errors of position and velocity in the cross range direction in the end of powered descent phase F2 are reduced.

Also, in the landing guidance calculation of the present embodiment, since the time-to-go t_go and the target thrust vectors $\alpha^*$ and $\beta^*$ are calculated by using the polynomial, the calculation load of the processing unit 34 in case of executing the landing guidance calculation can be reduced. Because the coefficients of the state equations which have been described in the landing guidance polynomial coefficient data 44 are calculated in advance as mentioned above, only the polynomial operation must be carried out in the calculation of time-to-go t_go at the step S14 and the calculation of target thrust vectors $\alpha^*$ and $\beta^*$ at the step S16.

As mentioned above, the embodiments of the present invention have been specifically described. However, the present invention is not limited to the above-mentioned embodiments. It could be understood to the skilled person that the present invention can be implemented with various changes or modifications.

For example, in the above-mentioned embodiment, the acceleration parameters A and B, the burn time variation d, the initial cross range position error $\theta_0$ and the initial horizontal velocity error $w_0$ are introduced as state quantities. However, it is not essential in the present invention to introduce all of these as the state quantities. If at least a part of these parameters is introduced, the spacecraft 10 can be guided correctly to a desired target point 3. For example, the landing guidance corresponding to the existence of a spacecraft error is possible only by introducing the acceleration parameters A and B as state quantities.

Also, in the above-mentioned embodiment, the time-to-go t_go and the target thrust vectors $\alpha^*$ and $\beta^*$ are calculated by using the polynomial. However, the time-to-go t_go and the target thrust vectors $\alpha^*$ and $\beta^*$ may be calculated by another method without using the polynomial. For example, information of mapping to the time-to-go t_go and the target thrust vectors $\alpha^*$ and $\beta^*$ from the state quantities is stored in the storage unit 33, and the time-to-go t_go and the target thrust vectors $\alpha^*$ and $\beta^*$ may be calculated by using this information of mapping. However, in the method in the present embodiment, the coefficients of the state equations are described in the landing guidance polynomial coefficient data 44 which are stored in the storage unit 33, and the time-to-go t_go and the target thrust vectors $\alpha^*$ and $\beta^*$ are calculated by using the polynomial. Therefore, the method in the present embodiment is effective to reduce the calculation load of the processing unit 34 while reducing an amount of information to be stored in the storage unit 33.

As described above, the embodiments of the present invention have been described. Here, the present invention can be implemented with various changes and modifications in the range of the technical thought of the present invention in addition to the embodiments. Also, the techniques specified in the embodiments can be combined in the range where there is no contradiction.

This application is based on Japan Patent Application JP 2016-251850 which was filed on Dec. 26, 2016 and claims the profit of the priority. The disclosure thereof is incorporated herein by reference.

The invention claimed is:

1. A spacecraft configured to land on a gravitational body, comprising:
an engine;
a thrust vector control device comprising at least one of a gimbal unit and a reaction control system (RCS) configured to control a thrust vector which is a direction of thrust generated by the engine; and
a processing unit configured to:
acquire state quantities of the spacecraft in a powered descent in which the spacecraft is guided to a target point while the engine generates the thrust; and
generate, based on the acquired state quantities, a throttling command to control combustion of the engine and an operation command to operate the thrust vector control device; and
a control command interface configured to:
supply the throttling command to the engine; and
supply the operation command to the thrust vector control device,
wherein the state quantities contain a first acceleration parameter and a second acceleration parameter, and
wherein the first acceleration parameter and the second acceleration parameter are calculated as coefficients A and B obtained by fitting based on an acceleration of the spacecraft detected at each time of past, supposing that the following equation (1) is satisfied between a reciprocal number 1/a of the acceleration a of the spacecraft and time t:

$$1/a = -At + B \quad (1),$$

wherein generating the throttling command comprises:
calculating a time-to-go as an output of a first polynomial having variables including a position of the spacecraft, a velocity of the spacecraft, the first acceleration parameter, and the second acceleration parameter, the time-to-go being a time for which the combustion of the engine is to be continued thereafter in the powered descent; and
generating the throttling command based on the time-to-go.

2. The spacecraft according to claim 1, wherein the processing unit is configured to calculate a burn time variation showing a change quantity of a time from a start of the combustion of the engine to a stop thereof from a nominal combustion time based on a combustion time of the engine to a current time from the start of the combustion of the engine in the powered descent, the time-to-go, and a nominal combustion time as the combustion time of the engine when the spacecraft is guided along a nominal orbit as an orbit planned initially for the spacecraft,
wherein the state quantities contain the burn time variation,
wherein the processing unit is configured to calculate a target thrust vector by using the first acceleration parameter, the second acceleration parameter and the burn time variation, and
wherein the thrust vector control device controls the thrust vector of the spacecraft such that the thrust vector of the spacecraft is directed to the target thrust vector.

3. The spacecraft according to claim 1, wherein the state quantities contain an initial cross range position error as a cross range angle of the spacecraft at a time when the powered descent is started and an initial horizontal velocity error as a velocity of the spacecraft in a cross range direction at the time when the powered descent is started,
wherein the main control device is configured to calculate a target thrust vector by using the initial cross range position error and the initial horizontal velocity error at each time during the powered descent, and
wherein the thrust vector control device controls the thrust vector of the spacecraft such that the thrust vector of the spacecraft is directed to the target thrust vector.

4. The spacecraft according to claim 1, further comprising a storage unit which stores landing guidance polynomial data which describes coefficients of the first polynomial, and
wherein the processing unit is further configured to calculate the time-to-go from the first polynomial by using the coefficients of the first polynomial described in the landing guidance polynomial data.

5. The spacecraft according to claim 4, wherein the coefficients of the first polynomial are calculated before the powered descent is started and stored in the storage unit as the landing guidance polynomial data.

6. The spacecraft according to claim 2, further comprising a storage unit which stores landing guidance polynomial data in which coefficients of a second polynomial having the state quantities as variables are described, and
wherein the processing unit is configured to calculate the target thrust vector from the second polynomial by using the coefficients of the second polynomial described in the landing guidance polynomial data.

7. The spacecraft according to claim 6, wherein the coefficients of the second polynomial are calculated before the powered descent is started and stored in the storage unit as the landing guidance polynomial data.

8. A non-transitory storage medium which stores a program to make a control device to operate so as to control a spacecraft which comprises an engine and is configured to carry out a powered descent while generating a thrust by the engine,
the program makes the control device execute a series of steps in the powered descent in which the spacecraft is guided to a target point while generating a thrust by the engine,
the series of steps comprising:
acquiring state quantities of the spacecraft;
generating a throttling command to control combustion of the engine according to the acquired state quantities; and
generating an operation command to operate a thrust vector control device which controls a thrust vector as a direction of thrust acting on the spacecraft according to the acquired state quantities;
wherein the state quantities contain a first acceleration parameter and a second acceleration parameter,
wherein the first acceleration parameter and the second acceleration parameter are respectively calculated as coefficients A and B obtained by fitting based on an acceleration of the spacecraft detected at each time of past, supposing that the following equation (1) is established between a reciprocal number 1/a of the acceleration a of the spacecraft and the time t:

$$1/a = -At + B \qquad (1),$$

wherein generating the throttling command comprises:
calculating a time-to-go as an output of a first polynomial having variables including a position of the spacecraft, a velocity of the spacecraft, the first acceleration parameter, and the second acceleration parameter, the time-to-go being a time for which the combustion of the engine is to be continued thereafter in the powered descent; and
generating the throttling command based on the time-to-go.

9. The non-transitory storage medium according to claim 8, wherein generating the operation command comprises:
calculating as one of the state quantities, a burn time variation showing a change quantity of a time from a start of the combustion of the engine to a stop thereof from a nominal combustion time, based on a combustion time of the engine from the start of the combustion of the engine to a current time in the powered descent, the time-to-go, and the nominal combustion time as the combustion time of the engine when the spacecraft is guided along a nominal orbit as an orbit planned initially for the spacecraft;
calculating a target thrust vector by using the first acceleration parameter, the second acceleration parameter and the burn time variation; and
generating the operation command such that the thrust vector of the spacecraft is directed to the target thrust vector.

10. The non-transitory storage medium according to claim 8,
wherein the state quantities contain an initial cross range position error as a cross range angle of the spacecraft at a time when the powered descent is started, and a initial horizontal velocity error as a velocity of the spacecraft in a cross range direction at the time when the powered descent is started,
generating the operation command comprises:
calculating a target thrust vector by using the initial cross range position error and the initial horizontal velocity error at each time of the powered descent; and
generating the operation command such that the thrust vector of the spacecraft is directed to the target thrust vector.

11. A control device configured to control a spacecraft having an engine and configured to carry out a powered descent while the engine generates a thrust,
the control device comprising:
a processing unit configured to acquire state quantities of the spacecraft in the powered descent, and generate a throttling command to control combustion of an engine according to the acquired state quantities and an operation command to operate a thrust vector control device to control a thrust vector as a direction of the thrust acting on the spacecraft; and
a control command interface configured to supply the throttling command to the engine and to supply the operation command to the thrust vector control device,
wherein the state quantities contain a first acceleration parameter and a second acceleration parameter, and
wherein the first acceleration parameter and the second acceleration parameter are respectively calculated as coefficients A and B obtained by fitting based on an acceleration of the spacecraft detected at each time of past, supposing that the following equation (1) is satisfied between a reciprocal number 1/a of the acceleration a of the spacecraft and time t:

$$1/a = -At + B \qquad (1),$$

wherein generating the throttling command comprises:
calculating a time-to-go as an output of a first polynomial having variables including a position of the spacecraft, a velocity of the spacecraft, the first acceleration parameter, and the second acceleration parameter, determining a time to go as the output of the first polynomial, the time-to-go being a time for which the combustion of the engine is to be continued thereafter in the powered descent; and
generating the throttling command according to the time-to-go.

12. The control device according to claim 11, wherein the processing unit is configured to calculate a burn time variation showing a change quantity of a time from a start of the combustion of the engine to a stop thereof from a nominal combustion time, based on the combustion time of the engine from the start of the combustion of the engine to a current time in the powered descent, the time-to-go and a nominal combustion time as a combustion time of the engine when the spacecraft is guided along a nominal orbit as an orbit planned initially for the spacecraft,
wherein the state quantities contain the burn time variation, and
wherein the processing unit calculates a target thrust vector by using the first acceleration parameter, the second acceleration parameter and the burn time variation, and generates the operation command such that the thrust vector of the spacecraft is directed to the target thrust vector.

13. The control device according to claim 11, wherein the state quantities contain an initial cross range position error as a cross range angle of the spacecraft at a time when the powered descent is started and an initial horizontal velocity error as a velocity of the spacecraft in a cross range direction at the time when the powered descent is started, and
wherein the processing unit calculates a target thrust vector by using the initial cross range position error and the initial horizontal velocity error at each time during the powered descent, and generates the operation command such that the thrust vector of the spacecraft is directed to the target thrust vector.

14. The control device according to claim 11, further comprising a storage unit configured to store landing guidance polynomial data which describe coefficients of the first polynomial, and
wherein the processing unit is configured to calculate the time-to-go from the first polynomial by using the coefficients of the first polynomial described in the landing guidance polynomial data.

15. The control device according to claim 12, wherein the processing unit has a storage unit configured to store landing guidance polynomial data which describe coefficients of a second polynomial having the state quantities as variables, and
wherein the processing unit is configured to calculate a target thrust vector based on the second polynomial by using the coefficients of the second polynomial described in the landing guidance polynomial data.

* * * * *